United States Patent
Fuchigami

(10) Patent No.: US 7,031,515 B2
(45) Date of Patent: Apr. 18, 2006

(54) IMAGE PROCESSING APPARATUS AND IMAGE PROCESSING METHOD

(75) Inventor: Takahiro Fuchigami, Yokosuka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 678 days.

(21) Appl. No.: 10/198,177

(22) Filed: Jul. 19, 2002

(65) Prior Publication Data

US 2004/0012815 A1   Jan. 22, 2004

(51) Int. Cl.
*G06K 9/00*   (2006.01)

(52) U.S. Cl. ............... 382/165; 382/164; 382/199

(58) Field of Classification Search ........... 382/164, 382/165, 173, 199; 358/2.1
See application file for complete search history.

(56) References Cited

U.S. PATENT DOCUMENTS 5,905,579 A   5/1999   Katayama et al.
6,655,861 B1 *  12/2003   Yamakawa ............... 400/76
6,795,576 B1 *   9/2004   Uchida et al. ............ 382/164
6,908,176 B1 *   6/2005   Koitabashi et al. ........ 347/43

FOREIGN PATENT DOCUMENTS

JP   2848558   11/1998

OTHER PUBLICATIONS

U.S. Appl. No. 09/860,574, filed May 21, 2001, Yamamoto et al.
U.S. Appl. No. 09/843,844, filed Apr. 4, 2001, Fuchigami et al.
U.S. Appl. No. 09/921,703, filed Aug. 6, 2001, Fuchigami et al.
U.S. Appl. No. 10/026,720, filed Dec. 27, 2001, Megawa et al.

* cited by examiner

*Primary Examiner*—Phuoc Tran
(74) *Attorney, Agent, or Firm*—Foley & Lardner LLP

(57) ABSTRACT

In an image segmentation section in an image processing apparatus, a screen dot area judgment result, a line width judgment result, a color judgment result, a first edge detection result and a second edge detection result are respectively substituted by logic values to make judgment, and an image segmentation result is output.

18 Claims, 14 Drawing Sheets

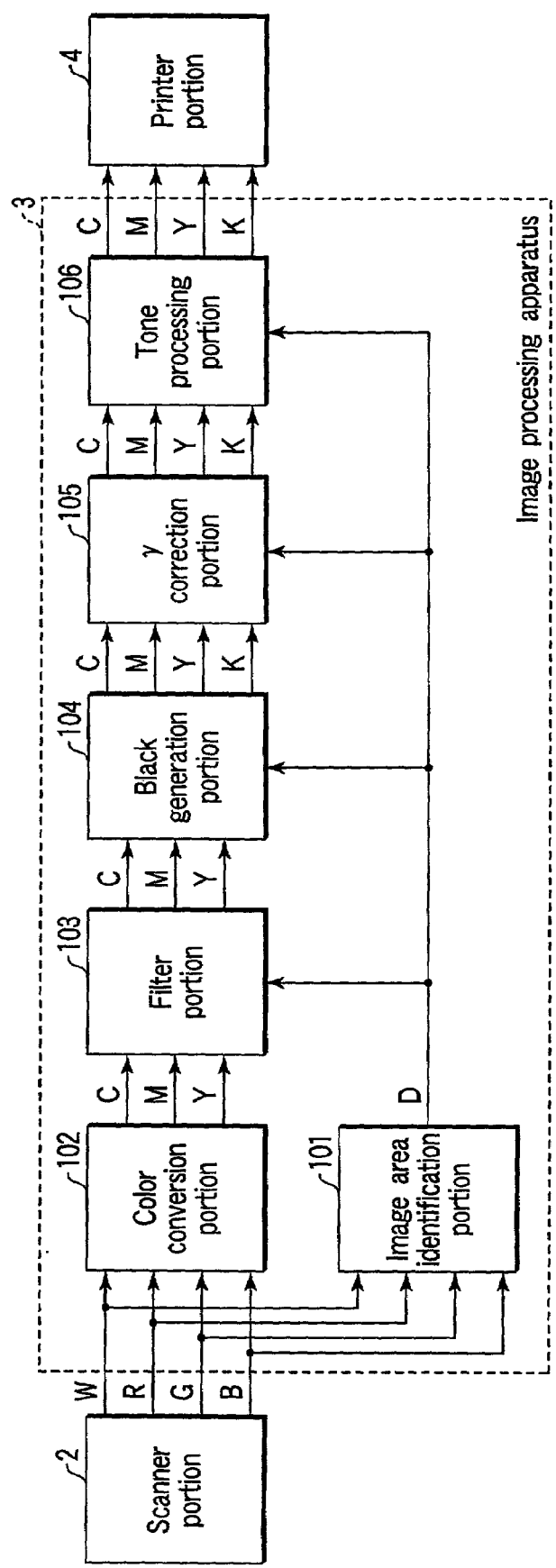
F I G. 4

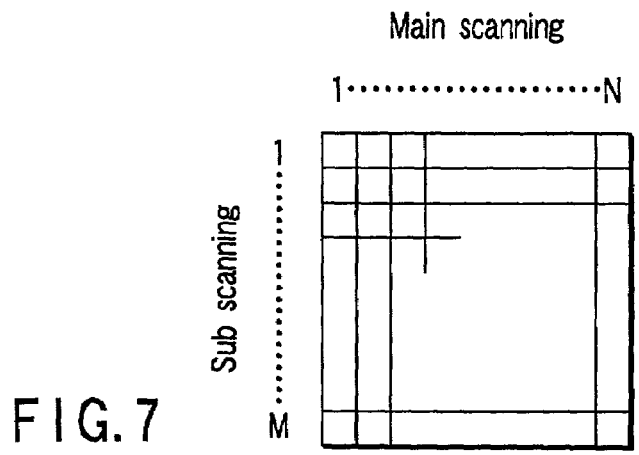
FIG. 7
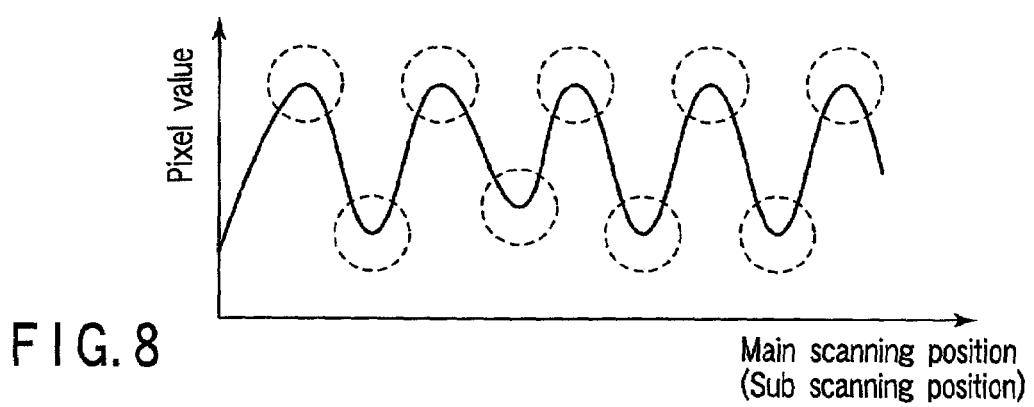
FIG. 8
| -1 | -1 | 0 | 1 | 1 |
|----|----|---|---|---|
| -2 | -2 | 0 | 2 | 2 |
| -4 | -4 | 0 | 4 | 4 |
| -2 | -2 | 0 | 2 | 2 |
| -1 | -1 | 0 | 1 | 1 |
FIG. 10
| -1 | -2 | -4 | -2 | -1 |
|----|----|----|----|----|
| -1 | -2 | -4 | -2 | -1 |
| 0  | 0  | 0  | 0  | 0  |
| 1  | 2  | 4  | 2  | 1  |
| 1  | 2  | 4  | 2  | 1  |
FIG. 11

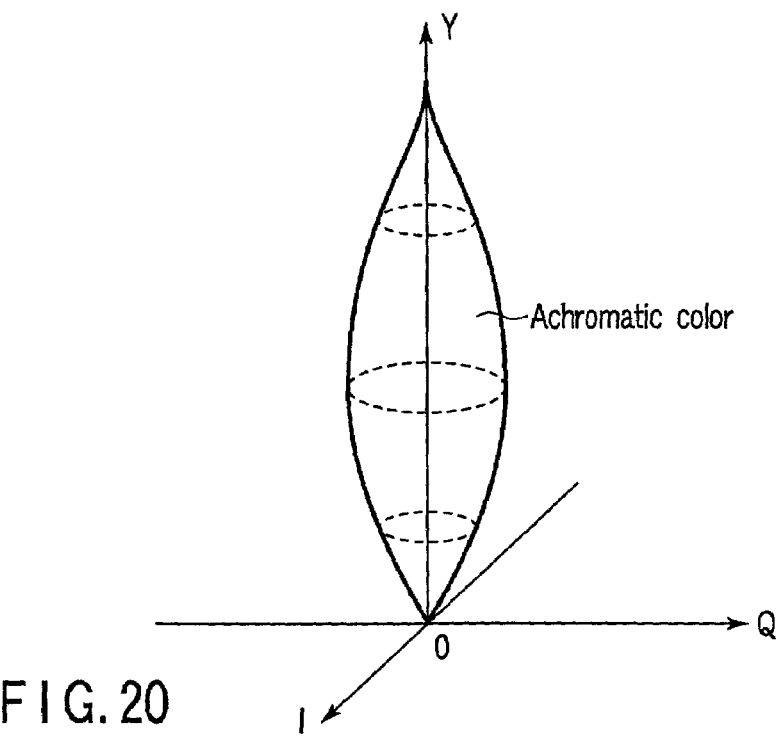
FIG. 20
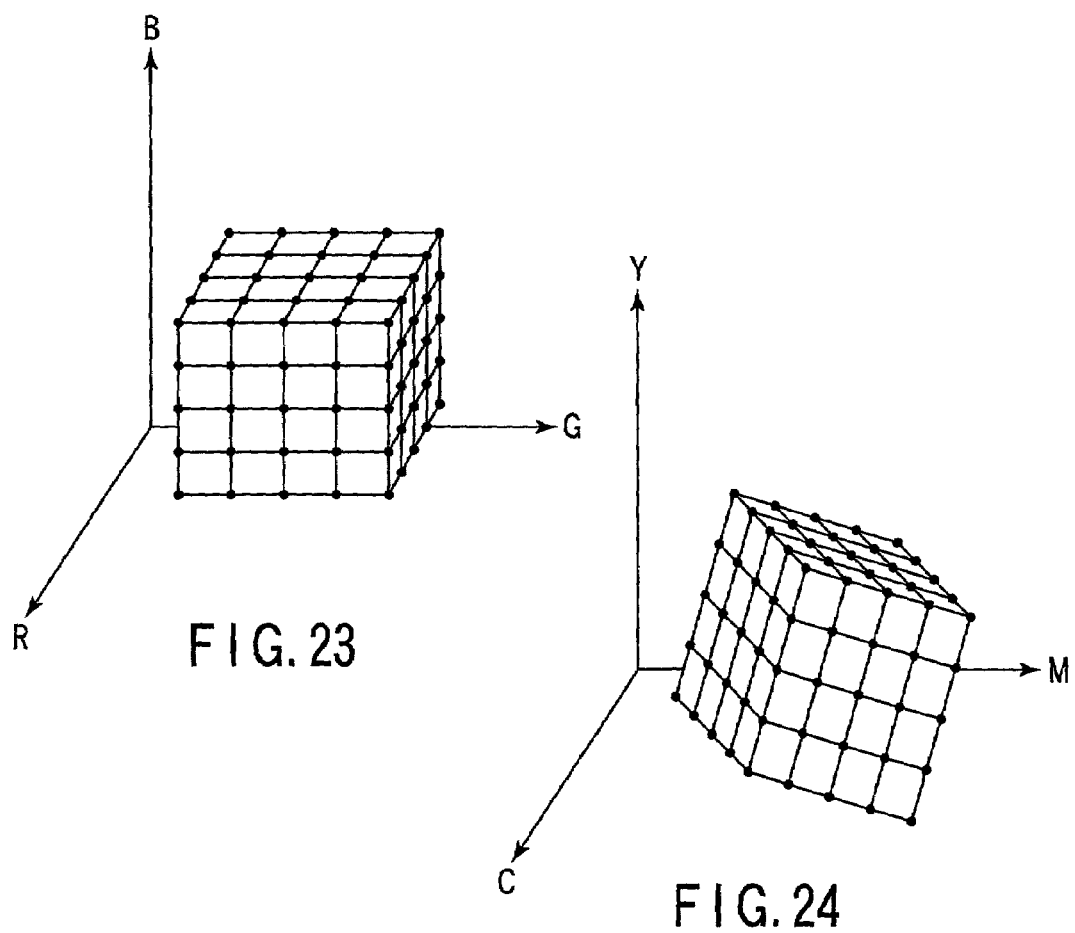
FIG. 23
FIG. 24

FIG. 21

$$\begin{bmatrix} Y \\ I \\ Q \end{bmatrix} = \begin{bmatrix} 0.30 & 0.59 & 0.11 \\ 0.60 & -0.28 & -0.32 \\ 0.21 & -0.52 & 0.31 \end{bmatrix} \begin{bmatrix} R \\ G \\ B \end{bmatrix}$$

| Output D | Dot area judgment | Line width judgment | Color judgment | First edge detection | Second edge detection |
|---|---|---|---|---|---|
| Black character/line drawing | 1 | 1/0 | 0 | 0 | 1 |
| Black character/line drawing | 0 | 1 | 0 | 1 | 0 |
| Black character/line drawing | 0 | 0 | 0 | 1 | 1 |
| Color character/line drawing | 1 | 1/0 | 1 | 0 | 1 |
| Color character/line drawing | 0 | 1 | 1 | 1 | 0 |
| Color character/line drawing | 0 | 0 | 1 | 1 | 1 |
| Non-character/line drawing | Combinations other than above | | | | |

FIG. 22

IMAGE PROCESSING APPARATUS AND IMAGE PROCESSING METHOD

BACKGROUND OF THE INVENTION

The present invention relates to an image processing apparatus and an image processing method which perform image processing with respect to an input color image in, for example, a digital color copying machine which reads a color image on a document and forms a reproduced image.

In general, a color copying machine separates the colors of a color image on a document by using, e.g., a color line CCD sensor, reads this image, converts the read image into a signal for a color material such as a color toner or a color ink, and prints according to this signal. This conversion is referred to as color conversion in this specification.

In color conversion, color separation signals R (red), G (green) and B (blue) are subjected to a predetermined calculation and thereby converted into color material signals C (cyan), M (magenta) and Y (yellow).

In such a color copying machine, the color image signals R, G and B are conventionally used to determine whether each remarked pixel is part of a character or a line drawing.

However, since image segmentation is carried out by using color image signals R, G and B having high resolution, the possibility of occurrence of an identification error of black characters/line art due to color shift is high, and image segmentation with high accuracy is difficult.

BRIEF SUMMARY OF THE INVENTION

It is an object of the present invention to provide an image processing apparatus and an image processing method which can perform image segmentation with high accuracy.

To achieve this aim, according to the present invention, there is provided an image processing apparatus which processes a plurality of image signals input from an image reading apparatus which has a first image reading section consisting of one or a plurality of line CCD sensors and a second image reading section consisting of a plurality of line CCD sensors having different color characteristics and reads an image on a document, the image processing apparatus comprising: a detection section which detects whether a remarked pixel in a first image signal read by the first image reading section is of an edge; a color judgment section which judges whether a remarked pixel in a second image signal read by the second image reading section has a chromatic color or an achromatic color; a black line drawing judgment section which judges whether the remarked pixel is of a black line drawing based on the result of detection from the detection section and the result of judgment from the color judgment section.

Further, according to the present invention, there is provided an image processing method which processes a plurality of image signals input from an image reading apparatus which has a first image reading section consisting of one or a plurality of line CCD sensors and a second image reading section consisting of a plurality of line CCD sensors having different color characteristics and reads an image on a document, the image processing method comprising: detecting whether a remarked pixel in a first image signal read by the first image reading section is of an edge; judging upon whether a remarked pixel in a second image signal read by the second image reading section has a chromatic color or an achromatic color; and judging whether the remarked pixel is of a black line drawing based on the result of detection in the first image signal and the result of judgment in the second image signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view schematically showing a structure of the image processing apparatus;

FIG. 7 is a view for illustrating M×N pixels;

FIG. 8 is a view for illustrating a peak;

FIG. 10 is a view showing an example of an edge detection filter;

FIG. 11 is a view showing an example of the edge detection filter;

FIG. 20 is a view for illustrating a processing outline of the color judgment portion;

FIG. 21 is a view for illustrating linear matrix conversion;

FIG. 22 is a view for illustrating judgment processing by a character/line drawing judgment portion;

FIG. 23 is a view for illustrating a processing outline of a color conversion portion;

FIG. 24 is a view for illustrating a processing outline of a color conversion portion;

DETAILED DESCRIPTION OF THE INVENTION

A preferred embodiment according to the present invention will be described hereinafter with reference to the accompanying drawings.

Figure 1:
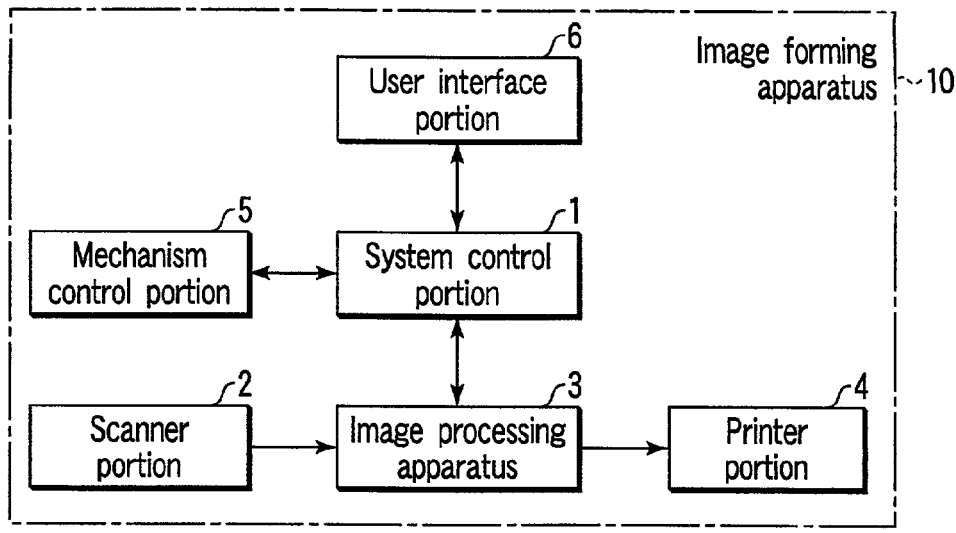
FIG. 1 is a view showing a schematic structure of an image forming apparatus according to an image processing apparatus of the present invention.

FIG. 1 shows a schematic structure of an image forming apparatus 10 according to an image processing apparatus of the present invention.

That is, the image forming apparatus 10 is constituted by a system control portion 1, a scanner portion 2, an image processing apparatus 3, a printer portion 4, a mechanism control portion 5, and a user interface portion 6.

The system control portion 1 controls the entire system.

The scanner portion 2 scans a document while illuminating the document by using a light source, and reads an image from the reflected light by a later-described four-line color CCD sensor.

The image processing apparatus 3 performs processing such as γ correction, color conversion, main scan variable power, image separation, treatment, area processing, tone correction processing with respect to image data read by the scanner portion 2.

The printer portion 4 forms an image based on the image data fed from the image processing portion 3.

The mechanism control portion 5 controls the mechanism of each unit constituting this apparatus.

In the user interface portion 6, a user inputs operation settings of this apparatus and displays a setting screen.

Figure 2:
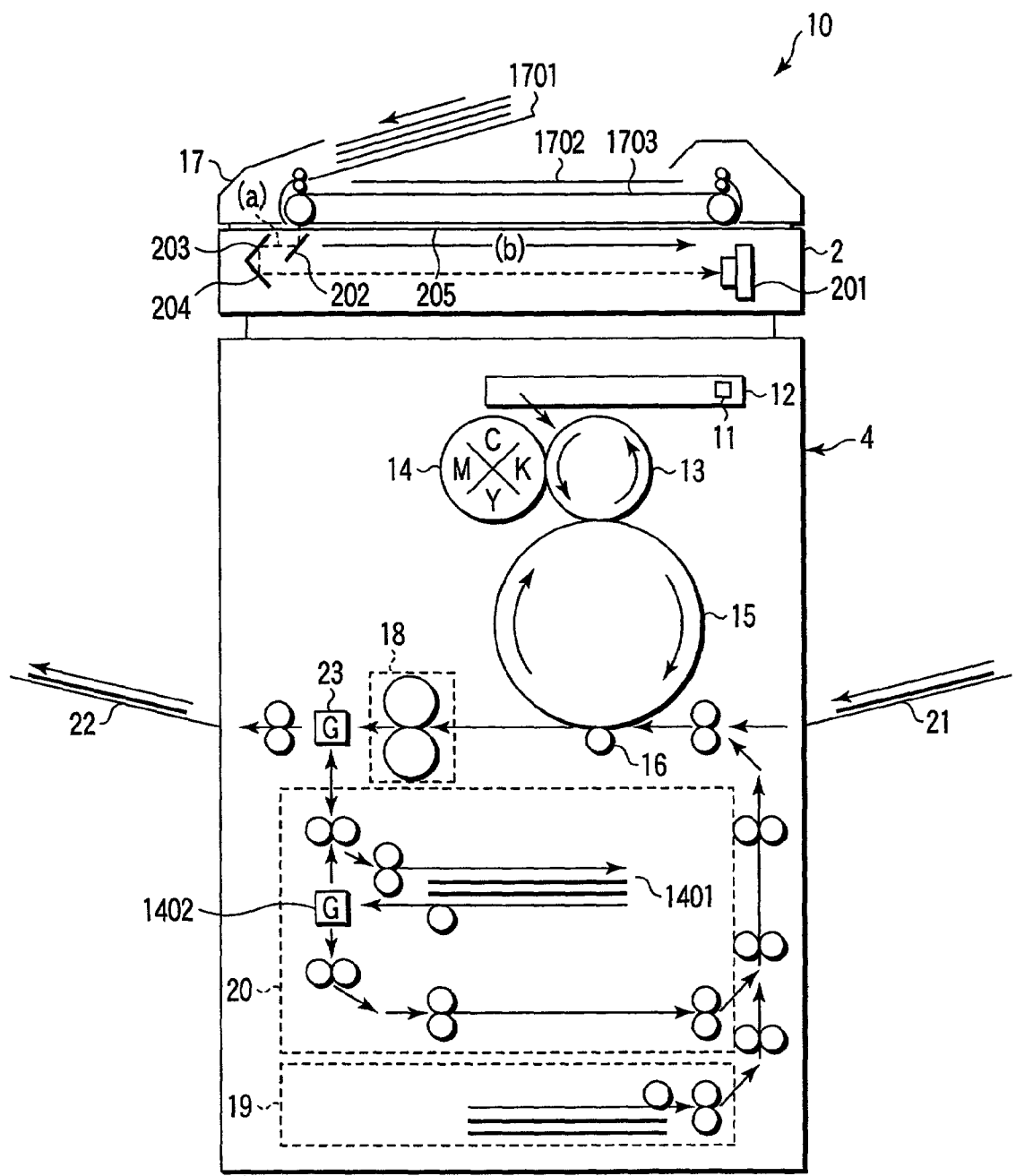
FIG. 2 is a view schematically showing an internal structure of the image forming apparatus.

FIG. 2 schematically shows an internal structure of the image forming apparatus 10. This image forming apparatus 10 is constituted by a scanner portion 2 and a printer portion 4.

On a top face of the scanner 2 is provided a document mounting base (document reading base) 205 consisting of a transparent glass on which a target of reading, i.e., a document is mounted. Further, on the top face of the scanner portion 2 is provided an automatic document feeder (ADF) 17 which automatically feeds the document onto the document mounting base 205. This automatic document feeder 17 is provided so as to be capable of opening/closing relative to the document mounting base 205, and also functions as a document holder which presses the document loaded in the document mounting base 205 against the document mounting base 205.

The scanner portion 2 is constituted by a four-line color CCD sensor 201 which reads a document image in units of one line with respect to each of R (red), G (green), B (blue) and W (black and white), a first mirror 202 which leads a line image on the document to the four-line color CCD, a second mirror 203, a third mirror 204, a document mounting base 205, and a light source (not shown) which is provided in the vicinity of the first mirror and obtains the reflected light of a read line on the document.

The printer portion 4 is constituted by an image writing portion 12 having a laser diode (LD) 11, a photoconductor drum 13, a development portion 14 which forms a developed image by causing the toner of each color to adhere, an intermediate transfer portion 15 which retransfers an image formed on the photoconductor drum 13 onto a transfer belt, a transfer portion 16 which transfers an image formed on the photoconductor drum 13 onto transfer paper, a fixing portion 18 which has a fixing roller and a pressure roller and performs heat fusing, a paper feed portion 19 which feeds the transfer paper, an automatic double-sided unit (ADU) 20, a manual paper feed portion 21, a paper ejection portion 22, and a carrying path switching gate 23.

The automatic document feeder 17 is constituted by a document set base 1701, a document ejection base 1702, and a document feed belt 1703. The document is set on the document set base 1701, and the document on the document set base 1701 is subjected to automatic paper feed or automatic paper ejection by the document feed belt 1703. When ejecting the paper, the document is ejected to the document ejection base 1702.

An image forming operation of the image forming apparatus 10 in such a structure will now be described with reference to FIGS. 1 and 2.

The system control portion 1 controls the entire image forming apparatus 10.

The document is first scanned by the scanner portion 2 while being illuminated by a non-illustrated light source, the reflected light from this document is received by the four-line color CCD sensor 201, and image data of this document is supplied to the image processing portion 3.

The image processing portion 3 subjects the supplied image data to image processing such as γ correction, color conversion, main scan variable power, image separation, treatment, area processing or tone correction processing, and transmits it to the printer portion 4.

The printer portion 4 drives the LD 11 and modulates the LD 11 in accordance with the supplied image data.

The photoconductor drum 13 is uniformly charged, and then a latent image is written on the photoconductor drum 13 by a laser beam from the LD 11. Also, the toner adheres to the photoconductor drum 13 by the development portion 14, thereby forming a developed image.

The image formed on the photoconductor drum 13 is again transferred onto the intermediate transfer belt of the intermediate transfer portion 15. In the case of a full-color copy, toners of four colors (black, cyan, magenta and yellow) are sequentially overlapped on the intermediate transfer belt of the intermediate transfer portion 15.

In the case of a full color copy, upon completion of processes of formation of images with four colors and transfer, the paper is fed by the paper feed portion 19 (or a manual paper feed tray 21) in timing with the intermediate transfer belt of the intermediate transfer portion 15, and the toners of four colors are simultaneously transferred onto the paper from the intermediate transfer belt of the intermediate transfer portion 15 in the transfer portion 16.

In the case of a single color copy, the toner of one color (black) is transferred onto the transfer belt from the photoconductor drum 13. Similar to full color copy, upon completion of the image forming and transfer processes, the paper is fed from the paper feed portion 19 (or the manual paper feed tray 21) in timing with the intermediate transfer belt of the intermediate transfer portion 15, and the toner is transferred onto the paper from the intermediate transfer belt of the intermediate transfer portion 15 in the transfer portion 16.

The transfer paper having the toner transferred thereon is fed to the fixing portion 18 through the carrying path, subjected to heat fusing by the fixing roller and the pressure roller, and ejected to the paper ejection portion 22.

Moreover, settings such as a copy mode determined by a user are input from the user interface portion 6. A set operation mode such as a copy mode is transmitted to the system control portion 1.

The system control portion 1 carries out control processing for executing the set copy mode. At this moment, the system control portion 1 issues control commands to the scanner portion 2, the image processing portion 3, the printer portion 4, the mechanism control portion 5, the user interface portion 6 or the like. In addition, the system control portion 1 likewise issues control commands to each unit such as the automatic double-sided unit 20 or the automatic document feeder 17 as shown in FIG. 2.

The operation of the automatic double-sided unit (which will be abbreviated as ADU hereinafter) 20 will now be described with reference to FIG. 2. The ADU 20 in this system has the following three functions.

The first function reverses the paper in order to eject the paper, which has been subjected to fixation and has the printed plane facing upward (which will be referred to as "face up" hereinafter), in such a manner that the printed plane is facing downward (which will be referred to as "face down" hereinafter).

That is, the transfer paper subjected to fixation in the fixing portion 18 is carried to the ADU 20 side by the carrying path switching gate 23, the carrying direction is inverted immediately after the paper rear end passes through the switching gate 23, and the transfer paper is ejected to the paper ejection portion 22. At this moment, the transfer paper is not stacked in a FIFO stack 1401. Such face-down paper ejection is required in order to match the printed plane (transfer plane) of the transfer paper with the output order when sequentially processing the document from a first page.

The second function reverses the fixed printed plane and stacks it in the ADU 20, takes out the transfer paper in the order of stacking in appropriate paper ejection timing, and ejects the transfer paper in the face-down manner.

That is, the paper subjected to fixation in the fixing portion 18 is carried to the ADU 20 side by the carrying path switching gate 23 and stacked in the FIFO stack 1401. In the appropriate paper ejection timing, the transfer paper is taken out from the FIFO stack 1401 in the order of stacking (from the lowermost side of stacking) and fed to the paper ejection portion 22 through the carrying path switching gates 1402 and 23 in the face-down manner.

In the present invention, this operation is carried out in order to temporarily evacuate to the FIFO stack the transfer paper which has been completely printed prior to the original paper ejection order and take out the transfer paper from the FIFO stack and eject it when the original paper ejection timing is obtained.

The third function reverses the printed plane in order to automatically execute the double-sided printing, and again circulates the transfer paper to the transfer portion 16.

That is, the transfer paper subjected to fixation in the fixing portion 18 is carried to the ADU 20 side by the carrying path switching gate 23, and stacked in the FIFO stack 1401. Further, this transfer paper is taken out immediately after being stacked in the FIFO stack 1401, carried to the paper carrying path by the carrying path switching gate 1402, and again fed to the transfer portion 16, thereby transferring the image onto the back side (non-transfer side). Then, the transfer paper having the back side to which the image is transferred is fixed in the fixing portion 18, and ejected to the paper ejection portion 22.

It is to be noted that the operation for adjusting the paper ejection order in the present invention is also enabled by using the circulation path at the time of double-sided printing as a stack without using the FIFO stack 1401. However, the condition is that a number of pieces of paper required for the circulation path must be held.

Furthermore, when the circulation path is used, the FIFO stack 1401 is no longer necessary (the turnover mechanism for reverse is required) and the mechanism can be simplified. However, a time loss is introduced when the transfer paper again passes the transfer portion 16 and the fixing portion 18.

Description will now be given as to the image reading operation in the scanner portion 2 using the automatic document feeder (which will be referred to as ADF hereinafter) 17 with reference to FIG. 2.

The scanner portion 2 can support two reading modes, i.e., a sheet through reading mode which reads the entire surface of the document by fixing a read position of the four-line color CCD sensor 201 and moving the document, and a flat bed reading mode which reads the entire surface of the document by fixing the document to the document mounting base 205 and moving the read position of the four-line color CCD sensor 201.

In the sheet through reading mode, the mirrors 202, 203 and 204 are arranged so as to read a document image on a fixed position (a) on the document mounting base 205, and the entire surface of the document is read when the document on the document set base 1701 is carried to the document mounting base 205.

In the flat bed reading mode, upon completion of carriage of the document on the document set base 1701 to the document mounting base 205, the entire surface of the document is read by movement (b) of the mirrors 202, 203 and 204 along the document mounting base 205.

It is to be noted that, in the sheet through reading mode and in the flat bed reading mode, the mirrors 202, 203 and 204 are arranged in such a manner that the light path length is fixed when the reflected light of the document image at the read position of the document reaches the four-line color CCD sensor 201. In particular, when the read position of the four-line color CCD sensor 201 moves in the flat bed reading mode, the respective mirrors 202, 203 and 204 are relatively moved in such a manner that the light path length becomes fixed.

Figure 3:
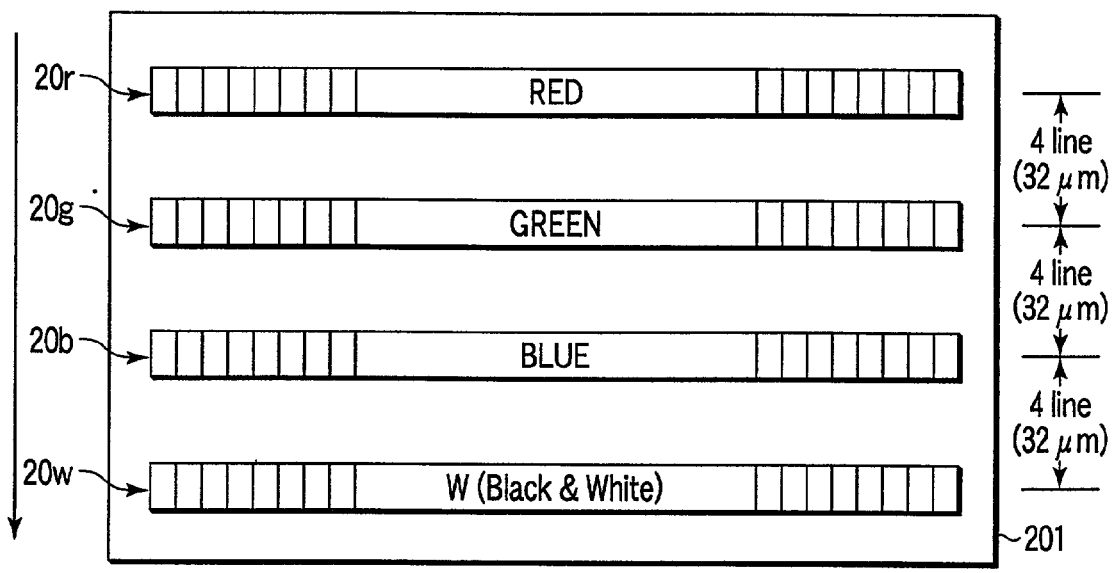
FIG. 3 is a view schematically showing a structure of a four-line color CCD sensor.

FIG. 3 schematically shows a structure of the four-line color CCD sensor 201.

The four-line color CCD sensor 201 has line sensors for four colors (R: red, G: green, B: blue, W: black and white).

The four-line color CCD sensor 201 is constituted by a W (black and white) sensor 20*w* as a brightness sensor with the high resolution, and an R sensor 20*r*, a G sensor 20*g* and a B sensor 20*b* having the low resolutions.

The distance between the line sensors of the respective colors is 32 μm, which corresponds to a distance of four lines when calculated to a number of pixels of the sensor.

Therefore, when the document image is read with the equal power, the line sensors of the respective colors read images on the document distanced every four lines, and hence the deviation of the lines must be corrected in the data in order to obtain the image information of the same line on the document image.

Assuming that the order of reaching the same line of the document image is the order of W, B, G and R, it is good enough to delay four lines for a G image, eight lines for a B image, and 12 lines for a W image in order to obtain the image data on the same line as the image which is currently read by R.

Moreover, when setting the movement speed at the read position to ¼ in order to obtain a 400% enlarged image, it is required to delay 16 lines for the G image, 32 lines for the B image and 48 lines for the W image. Conversely, when doubling the movement speed in order to obtain a 50% reduced image, it is good enough to delay two lines for the G image, four lines for the B image and six lines for the W image.

FIG. 4 schematically shows a structure of the image processing apparatus 3. The image processing apparatus 3 is constituted by an image segmentation portion 101, a color conversion portion 102, a filter portion 103, a black generation portion 104, a γ correction portion 105, and a tone processing portion 106.

The image processing apparatus 3 discriminates a character/line drawing portion with respect to an image signal input from a scanner portion 2, intensifies that portion, and outputs it to the printer portion 4.

The scanner portion 2 optically reads the document placed on the document mounting base 205 by using the four-line color CCD sensor 201, performs analog-to-digital conversion and range correction, and generates image signals of W (black and white), R (red), G (green) and B (blue).

The image signals of W, R, G and B generated in the scanner portion 2 are input to the image segmentation portion 101 and the color conversion portion 102.

The image segmentation portion 101 identifies whether each pixel of the document image is a character/line drawing by using the image signals of W, R, G and B input thereto.

The color conversion portion 102 converts the image signals of W, R, G and B input thereto into color signals of C (cyan), M (magenta) and Y (yellow) which are component colors used for image formation in accordance with each pixel. The color signals of C, M and Y output from the color conversion portion 102 are respectively transmitted to the filter portion 103.

The filter portion 103 carries out filtering processing of the color signals of C, M and Y input thereto. The color signals of C, M and Y output from the filter portion 103 are respectively transmitted to the black generation portion 104.

The black generation portion 104 generates signals of K (black) from the color signals of C, M and Y inputted thereto. In case of performing color printing, when printing is started from inks of three colors C, M and Y, gray close to black is obtained. Therefore, a signal (K) of a black part is generated in such a manner that the black part can be correctly printed as a black pixel. The signals of C, M, Y and K output from the black generation portion 104 are transmitted to the γ correction portion 105.

The γ correction portion 105 performs γ correction of the signals C, M, Y and K input thereto. The signals of C, M, Y and K subjected to γ correction and output from the γ correction portion 105 are transmitted to the tone processing portion 106.

The tone processing portion 106 performs processing of, e.g., an error diffusion method to the signals of C, M, Y and K input thereto in accordance with a recordable bit number of the printer portion 4. The signals of C, M, Y and K output from the tone processing portion 106 are fed to the printer portion 4.

The printer portion 4 performs printing and outputting based on the signals of C, M, Y and K input thereto.

The image segmentation portion 101 will now be described.

Figure 5:
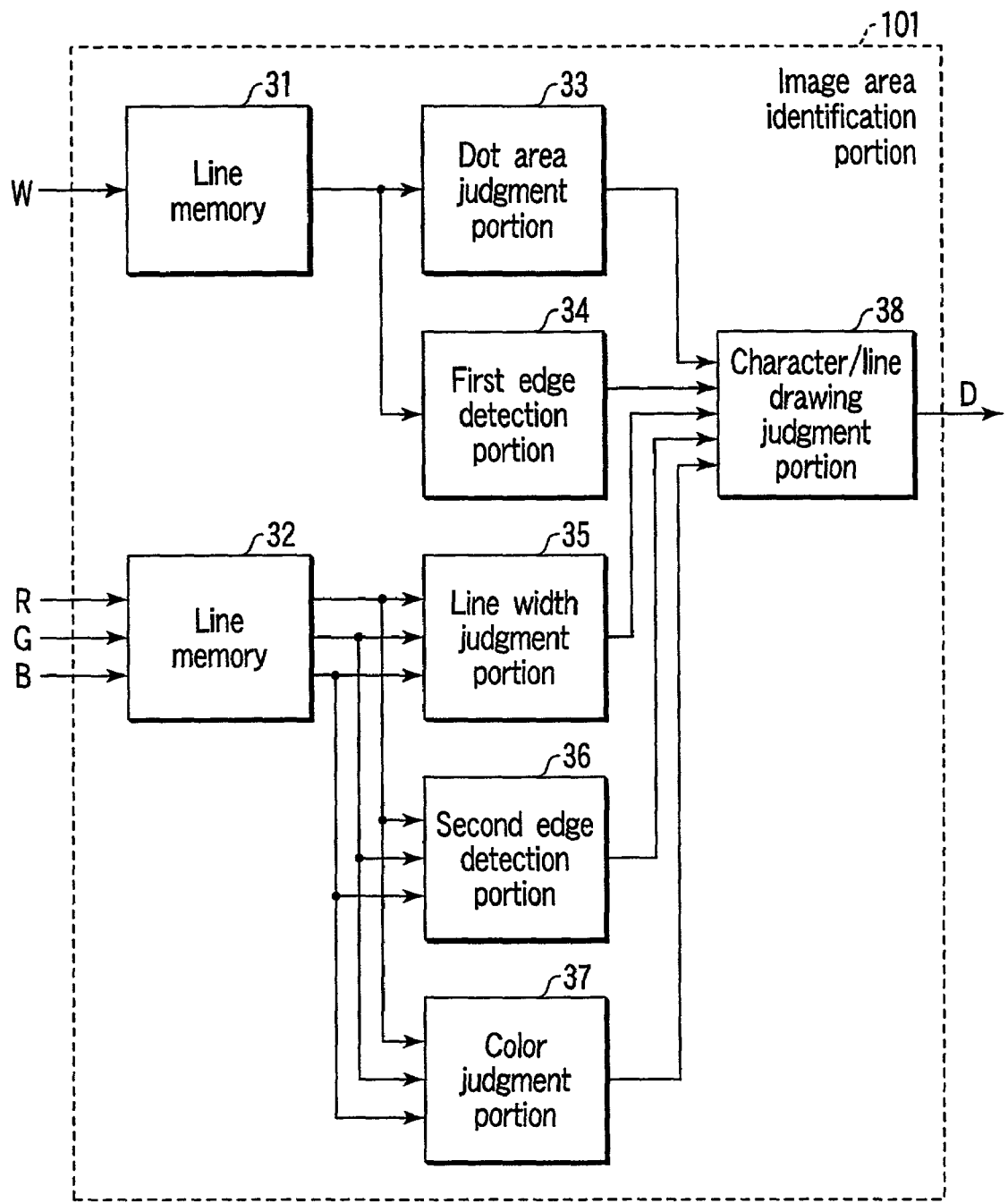
FIG. 5 is a block diagram showing a detailed structural example of an image segmentation portion according to the present invention.

FIG. 5 shows a detailed structural example of the image segmentation portion 101 according to the present invention. That is, the image segmentation portion 101 is constituted by line memories 31 and 32, a screen dot area judgment portion 33, a first edge detection portion 34, a line width judgment portion 35, a second edge detection portion 36, a color judgment portion 37, and a character/line drawing judgment portion 38.

The line memory 31 stores an image signal of W inputted from the scanner portion 2 in a FIFO (First In First Out) memory so that a plurality of lines can be simultaneously referred at the rear stage.

The line memory 32 stores image signals of R, G and B inputted from the scanner portion 2 in the FIFO (First in First Out) memory so that a plurality of lines can be simultaneously referred at the rear stage.

The screen dot area judgment portion 33 makes judgment upon whether hatching (screen processing with respect to a printed matter or the like) is performed in accordance with each local area by using the image signal of W stored in the line memory 31.

The first edge detection portion 34 analyzes a gradient quantity of a pixel value around a remarked pixel and makes judgment upon whether the remarked pixel is an edge by using the image signal of W stored in the line memory 31.

The line width judgment portion 35 judges whether each remarked pixel exists in a line segment having a predetermined line width by using the image signals of R, G and B stored in the line memory 32.

The second edge detection portion 36 analyzes a gradient quantity of a pixel value around each remarked pixel and judges whether the remarked pixel is an edge by using the image signals of R, G and B stored in the line memory 32.

The color judgment portion 37 calculates a chroma of each remarked pixel and judges whether the remarked pixel has a chromatic color based on comparison with a predetermined value by using the image signals of R, G and B stored in the line memory 32.

The character/line drawing judgment portion 38 judges whether the remarked pixel is a pixel of a black character/line drawing part, whether it is a pixel of a character/line drawing part of any color other than black, or whether it is not a pixel of a character/line drawing part from detection results of the first edge detection portion 34 and the second edge detection portion 36 based on respective judgment results of the screen dot area judgment portion 33, the line width judgment portion 33 and the color judgment portion 37.

Figure 6:
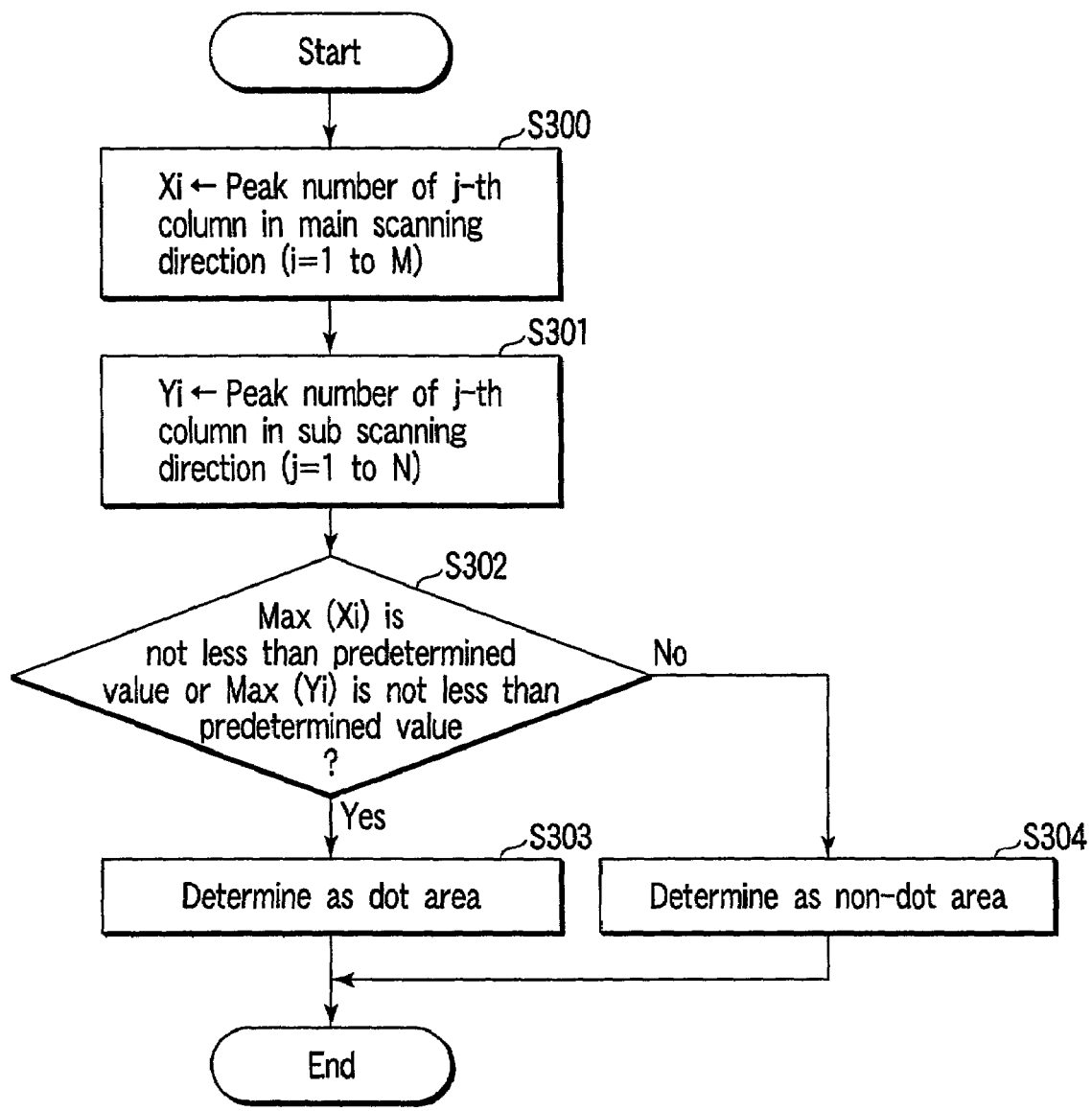
FIG. 6 is a flowchart for illustrating processing of a screen dot area judgment portion.

The processing by the screen dot area judgment portion 33 will now be described with reference to a flowchart of FIG. 6.

The screen dot area judgment portion 33 latches M×N pixels from the image data of W stored in the line memory 31 as shown in FIG. 7, and counts a peak number of a change in pixel value in the main scanning direction every 1 to N lines (step S300). It is to be noted that the peak means a maximum point and a minimum point circled by dotted lines shown in FIG. 8.

On the other hand, the screen dot area judgment portion 33 counts a peak number of a change in level in the sub scanning direction every 1 to M columns (step S301).

Then, the screen dot area judgment portion 33 compares a maximum value of the peak number in the main scanning direction and a maximum value of the peak number in the sub scanning direction with respective predetermined values (step S302).

As a result, the screen dot area judgment portion 33 determines that this area is a screen dot area if any one is true (step S303), and determines that this area is a non-screen dot area if the both are not true (step S304).

However, the above-described processing is an example, and the screen dot area judgment in the present invention is not restricted to the above-described processing method.

Figure 9:
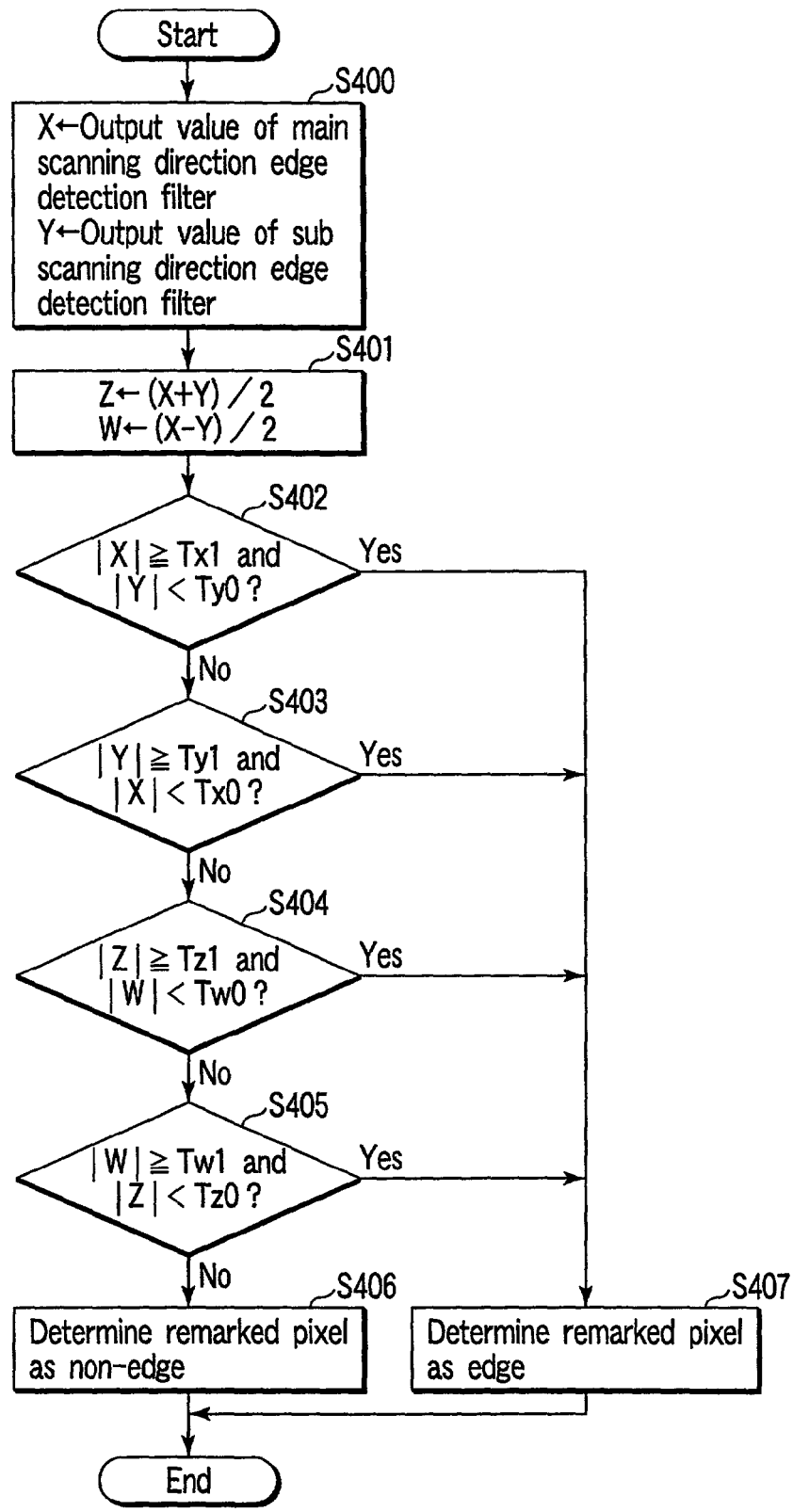
FIG. 9 is a flowchart for illustrating processing by a first edge detection portion.

Next, the processing by the first edge detection portion 34 will be described with reference to a flowchart of FIG. 9. FIGS. 10 and 11 are views for illustrating a processing outline of the first edge detection portion 34.

The first edge detection portion 34 latches, e.g., 5×5 pixels around a remarked pixel from the image data of W stored in the line memory 31, applies edge detection filters such as shown in FIG. 10 and FIG. 11, and determines output values of the respective filters as X and Y (step S400).

Here, FIG. 10 shows an example of the edge detection filter in the main scanning direction (horizontal direction), and FIG. 11 shows the same in the sub scanning direction (vertical direction).

The first edge detection portion 34 calculates a value Z obtained by dividing a sum of the output values X and Y from the respective filters by 2, and a value W obtained by dividing a difference of the same by 2 (step S401).

Subsequently, the first edge detection portion 34 judges whether an absolute value of X is equal to or larger than a predetermined value Tx1 and whether an absolute value of Y is less than a predetermined value Ty0 (step S402), and determines that the remarked pixel is an edge if these are true (step S407).

If not true at step S402, the first edge detection portion 34 judges whether the absolute value of Y is equal to or larger than a predetermined value Ty1 and whether the absolute value of X is less than a predetermined value Tx0 (step S403), and determines that the remarked pixel is an edge if these are true (step S407).

If not true at step S403, the first edge detection portion 34 judges whether an absolute value of Z is equal to or larger than a predetermined value Tz1 and whether an absolute value of W is less than a predetermined value Tw0 (step S404), and determines that the remarked pixel is an edge if these are true (step S407).

If not true at step S404, the first edge detection portion 34 judges whether the absolute value of W is equal to or larger than a predetermined value Tw1 and whether the absolute value of Z is less than a predetermined value Tz0 (step S405), and determines that the remarked pixel is an edge if these are true (step S407).

If not true at step S405, the first edge detection portion 34 determines that the remarked pixel is a non-edge (step S406).

However, the above-described edge detection processing is an example, and edge detection in the present invention is not restricted to the above-described processing content.

Figure 12:
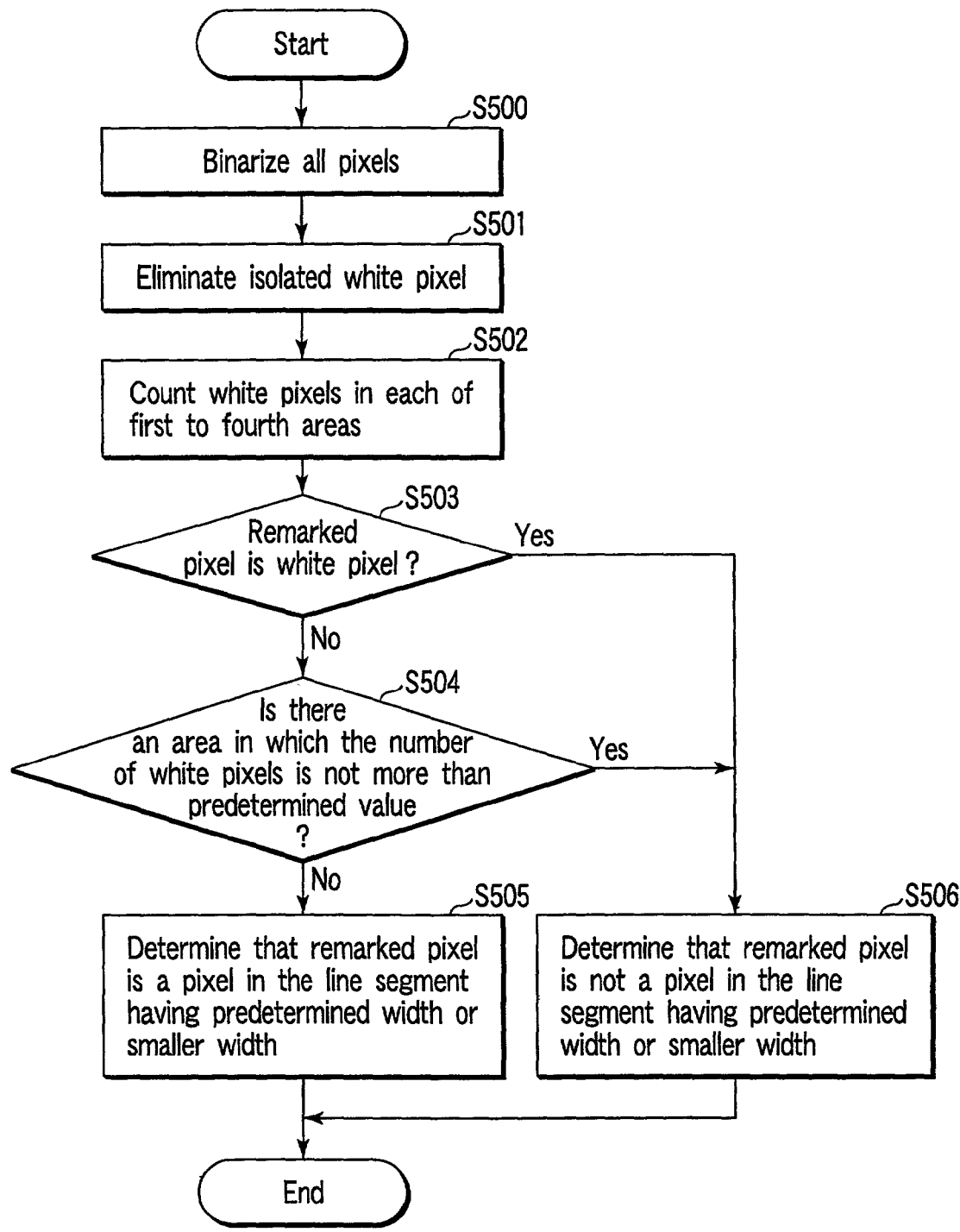
FIG. 12 is a flowchart for illustrating processing by a line width judgment portion.

The processing by the line width judgment portion 35 will now be described with reference to a flowchart of FIG. 12.

Figures 13, 15, 16, 17, 18:
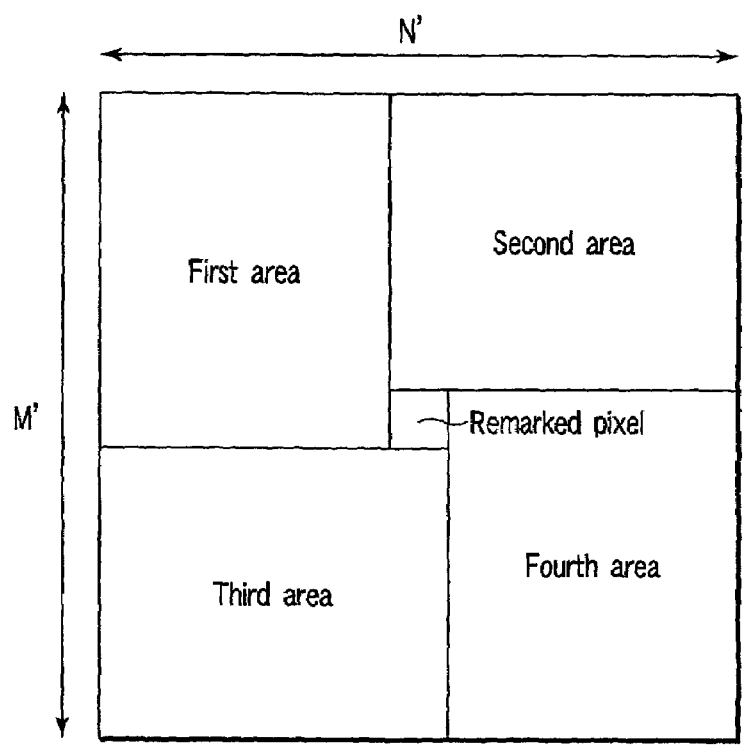
FIG. 13 is a view for illustrating latching of M'×N' pixels.
FIG. 15 is a view showing an example of the edge detection filter.
FIG. 16 is a view showing an example of the edge detection filter.
FIG. 17 is a view showing an example of the edge detection filter.
FIG. 18 is a view showing an example of the edge detection filter.

The line width judgment portion 35 latches M'×N' pixels illustrated in FIG. 13 from the image data of R, G and B stored in the line memory 32, and binarizes (black and white separation) all of these pixels based on a predetermined threshold value (step S500).

In addition, the line width judgment portion 35 changes each binarized pixel to a black pixel if it is a white pixel having no white pixel in the vicinity thereof (step S501).

Then, the line width judgment portion 35 counts the white pixels in each of first to fourth areas around the remarked pixel such as shown in FIG. 13 (step S502).

Here, the line width judgment portion 35 judges whether the remarked pixel is a white pixel (step S503), and determines that the remarked pixel is not a pixel which exists in the line segment having a predetermined line width or a smaller line width if it is true (step S506).

If not true at step S503, the line width judgment portion 35 judges whether a number of white pixels are not more than a predetermined value in any of the first to fourth areas (step S504), and determines that the remarked pixel is not a pixel which exists in the line segment having a predetermined line width or a smaller line width if it is true (step S506).

If it is not true at step S504, the line width judgment portion 35 determines that the remarked pixel is a pixel which exists in the line segment having a predetermined line width or a smaller width (step S505).

However, the above-described processing is an example, and line width judgment in the present invention is not restricted to the processing content mentioned above.

In addition, the above-described processing may be carried out in accordance with each color (R, G, B) of the image data in order to integrate judgment results, or the image data of black and white may be generated from the color image data in advance to perform judgment.

Figure 14:
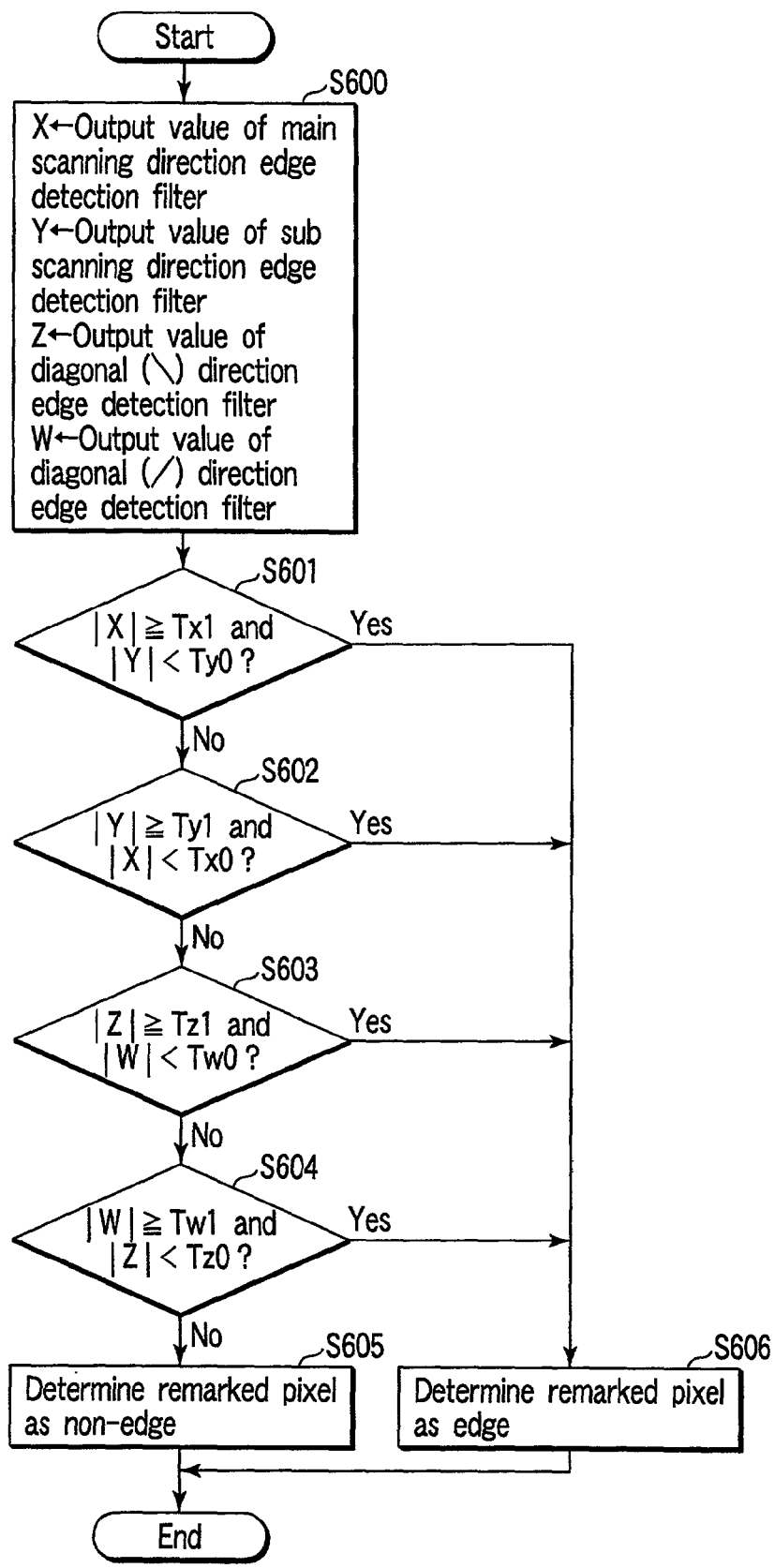
FIG. 14 is a flowchart for illustrating processing by a second edge detection portion.

The processing by the second edge detection portion 36 will now be described with reference to a flowchart of FIG. 14. FIGS. 15 to 18 are views for illustrating a processing outline of the second edge detection portion 36.

The second edge detection portion 36 latches, e.g., 5×5 pixels around a remarked pixel from the image data of R, G and B stored in the line memory 32, applies edge detection filters shown in FIGS. 15 to 18, and determines output values from the respective filters as X, Y, Z and W (step S600).

Here, FIG. 15 shows an example of the edge detection filter in the main scanning direction (horizontal direction), FIG. 16 shows the same in the sub scanning direction (vertical direction), FIG. 17 shows the same in the downward-sloping diagonal (\) direction, and FIG. 18 shows the same in the upward-sloping diagonal (/) direction.

Subsequently, the second edge detection portion 36 judges whether an absolute value of X is equal to or larger than a predetermined value Tx1 and whether an absolute value of Y is less than a predetermined value Ty0 (step S601), and determines that the remarked pixel is an edge if these are true (step S606).

If not true at step S601, the second edge detection portion 36 judges whether the absolute value of Y is equal to or larger than a predetermined value Ty1 and whether the absolute value of X is less than a predetermined value Tx0 (step S602), and determines that the remarked pixel is an edge if these are true (step S606).

If not true at step S602, the second edge detection portion 36 judges whether an absolute value of Z is equal to or larger than a predetermined value Tz1 and whether an absolute value of W is less than a predetermined value Tw0 (step S603), and determines that the remarked pixel is an edge if these are true (step S606).

If not true at step S603, the second edge detection portion 36 judges whether an absolute value of W is equal to or larger than a predetermined value Tw1 and whether an absolute value of Z is less than a predetermined value Tz0 (step S604), and determines that the remarked pixel is an edge if these are true (step S606).

If not true at step S604, the second edge detection portion 36 determines that the remarked pixel is a non-edge (step S605).

However, the above-described edge detection processing is an example, and edge detection in the present invention is not restricted to the processing content mentioned above (step S605).

Additionally, the processing content of the second edge detection portion 36 may be similar to that of the first edge detection portion 34. However, since the resolution of the image referred by the first edge detection portion 34 is different from the counterpart referred by the second edge detection portion 36, the meanings of the output results differ from each other even if the processing contents are similar.

Further, edge detection by the second edge detection portion 36 may be performed in accordance with each color (R, G, B) of the color image in order to integrate the judgment results, or a monochrome image may be generated from the color image in advance to carry out judgment.

Figure 19:
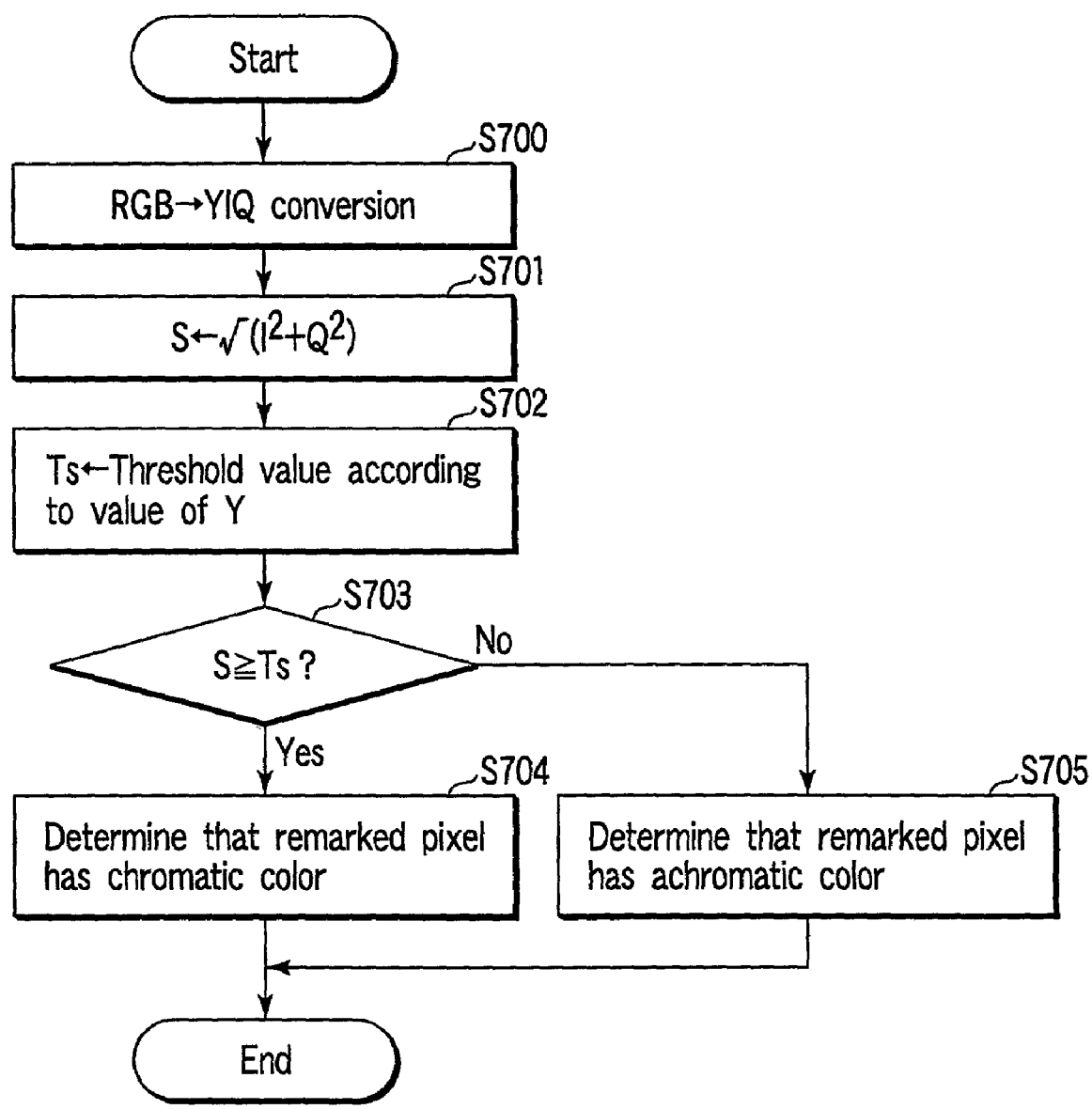
FIG. 19 is a flowchart for illustrating processing of a color judgment portion.

The processing by the color judgment portion 37 will now be described with reference to a flowchart of FIG. 19. FIG. 20 is a view for illustrating a processing outline of the color judgment portion 37.

The color judgment portion 37 first converts color pixel values R, G and B of each remarked pixel of the image data of R, G and B stored in the line memory 32 into a brightness Y and color differences I and Q (step S700). This conversion from R, G and B into Y, I and Q can be performed based on the linear matrix conversion such as an expression shown in FIG. 21.

Then, the color judgment portion 37 calculates a chroma S by taking a square root of a square-sum of the color differences I and Q obtained by conversion (step S701).

Further, the color judgment portion 37 obtains a threshold value Tx according to a value of Y by using a lookup table or the like using a value of the brightness Y obtained by conversion as an address (step S702).

Then, the color judgment portion 37 judges whether the chroma S is equal to or larger than the threshold value Ts (step S703), and determines that the remarked pixel has a chromatic color if this is true (step S704) and that the remarked pixel has an achromatic color if this is not true (step S705).

With such processing, as shown in FIG. 20, it can be determined that the pixel in the vicinity of the axis Y in the color space of Y, I and Q has an achromatic color, namely, gray.

Subsequently, the processing in the character/line drawing judgment portion 38 can be basically performed by the logic arithmetic operation of a plurality of judgment results mentioned above.

For example, a screen dot area judgment result (0: non-screen dot area, 1: screen dot area), a line width judgment result (0: out of a line segment having a predetermined width, 1: within a line segment having a predetermined width), a color judgment result (0: achromatic color, 1: chromatic color), a first edge detection result (0: non-edge, 1: edge), and a second edge detection result (0: non-edge, 1: edge) are respectively substituted by logic values, and judgment processing such as shown in FIG. 22 is carried out.

In FIG. 22, for example, if the screen dot area judgment result is "0", the line width judgment result is "1", the color judgment result is "0", the first edge detection result is "1" and the second edge detection result is "0", an output D as the judgment result is "black character/line drawing".

Moreover, in order to improve the accuracy of the character/line drawing judgment result, it is also possible to simultaneously judge pixels in the vicinity of the remarked pixel and judge the remarked pixel by using the judgment result of all of these pixels.

The color conversion portion 102 will now be described.

FIGS. 23 and 24 illustrate the processing outline of the color conversion portion 102. The image signals of R, G and B are converted into colors signals of C, M and Y by associating lattice points arranged at equal intervals which are defined in the color space of R, G and B shown in FIG. 23 with the lattice points in the color space of C, M and Y shown in FIG. 24 based on an LUT (lookup table).

In addition, since the color image signal is input with low resolution, the resolution is increased in the color conversion portion 102 by using a method of, e.g., linear interpolation. However, in case of the black color mode, the brightness signal is converted into the concentration signal by range correction and γ conversion, and it is output as a color image signal having equal quantities of C, M and Y.

The filter portion 103 will now be described.

The filter portion 103 applies the space filter to the color signals of C, M and Y by taking a weighted linear sum of the pixel values in an image area around each remarked pixel in accordance with each color signal.

Figure 25:
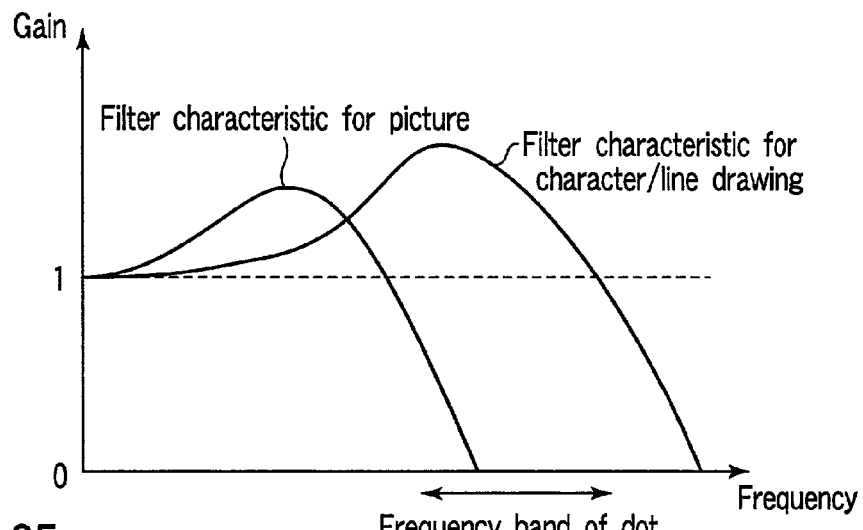
FIG. 25 is a view for illustrating processing by a filter portion.

As shown in FIG. 25, the filter portion 103 aims at improving the sharpness of the image by increasing the gain of a specific frequency band. However, as different from the character/line drawing part, in the case of a picture part or the like constituted by dots, if the frequency of the dots is emphasized, moire may be thereby generated. Therefore, the filter portion 103 switches the filter characteristics in accordance with the image segmentation result of the image segmentation portion 101.

The black generation portion 104 will now be described.

The black generation portion 104 generates a color signal of a black component (K) from the color signals of C, M and Y outputted from the filter portion 103 in order to increase the reproducibility of a black character or a shadow part in the printer portion 4. As the processing in the black generation portion 104, there is well known a method which determines a minimum value among the three colors C, M and Y as a value of K and determines a value obtained by subtracting K from respective values of C, M and Y as new values of C, M and Y as in the following expressions:

$$K=\mathrm{MIN}(C, M, Y)$$

$$C'=C-K$$

$$M'=M-K$$

$$Y'=Y-K$$

Further, the processing which determines an average value of the three colors C, M and Y as a value of K and determines all of the values of C, M and Y to zero is carried out with respect to a part of the black character/line drawing from the image segmentation result of the image segmentation portion 101 as in the following expressions:

$$K=(C+M+Y)/3$$

$$C'=M'=Y'=0$$

The γ correction portion 105 will now be described.

Figure 26:
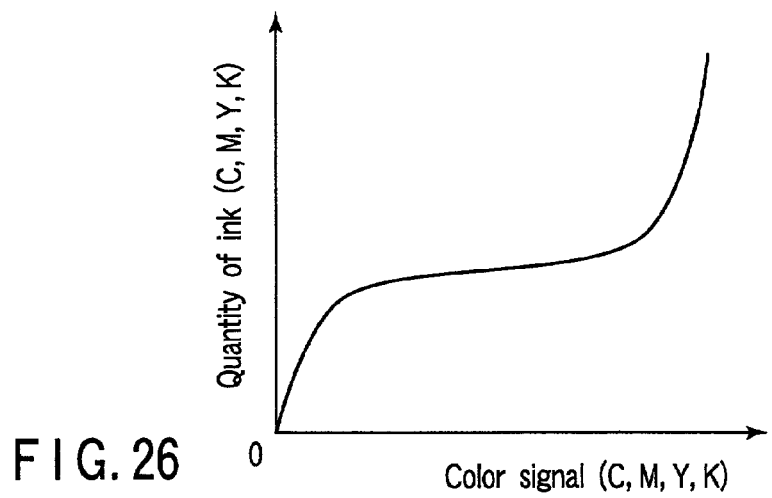
FIG. 26 is a view for illustrating conversion from a color signal value to a quantity of ink.

The γ correction portion 105 converts the color signal value into a quantity of ink by using a conversion table for each color illustrated in FIG. 26 in order to absorb a difference between a tone characteristic of the color signals of C, M, Y and K and a tone characteristic of image formation in the printer portion 4.

Figure 27:
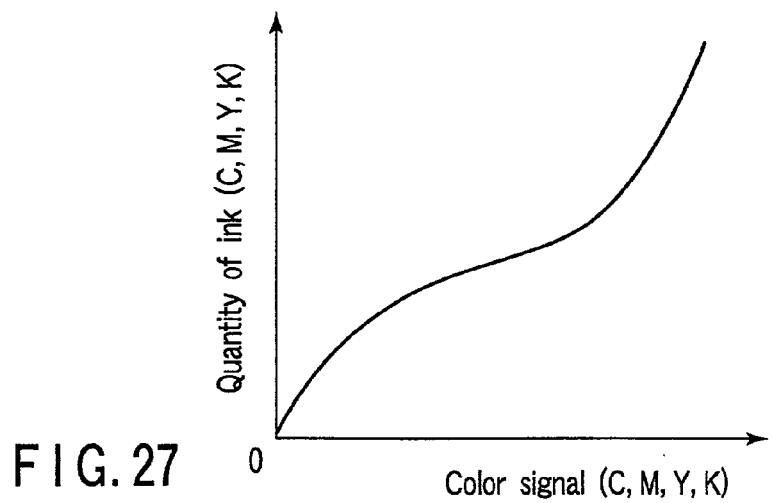
FIG. 27 is a view for illustrating a conversion table which intensifies contrast.

Here, the conversion table utilized for increasing the contrast is used for the character/line drawing part from the image segmentation result of the image segmentation portion 101 in order to increase the sharpness as shown in FIG. 27.

The tone processing portion 106 will now be described.

The tone processing portion 106 performs dithering for effecting tone reproduction (area modulation) in the pseudo manner by using a predetermined number of pixels when a tone number in image formation by the printer portion 4 is smaller than a tone number of the image signal.

For example, in case of outputting the image signal of 256 tones by using the printer of two tones, the 256 tones (actually 257 tones) can be theoretically reproduced by using 16×16 pixels.

However, if area modulation is simply conducted with respect to the character/line drawing part from the image segmentation result of the image segmentation portion 101, the edge structure collapses.

Thus, in order to save the edge structure, the tone processing portion 106 carries out simple binarization of the pixels which are determined as characters/line drawings in the image segmentation portion 101, and performs tone reproduction by using only any other pixels.

Finally, the printer portion 4 will now be described.

The printer portion 4 performs image formation by transferring onto the paper an ink whose quantity is based on the color signals of C, M, Y and K output from the image processing apparatus 3.

Incidentally, in the image segmentation portion 101 according to this embodiment, judgment is made in the character/line drawing judgment portion 38 by using judgment results and detection results from the screen dot area judgment portion 33, the first edge detection portion 34, the line width judgment portion 35, the second edge detection portion 36 and the color judgment portion 37, but the following combination may be utilized.

Judgment is made in the character/line drawing judgment portion 38 by using a detection result from the first edge detection portion 34 and a color judgment result from the color judgment portion 37. In this case, using the color image signal having low resolution enables color judgment which is rarely affected by lens aberration of the scanner portion 2.

Judgment is made in the character/line drawing portion 38 by using a detection result from the first edge detection portion 34 and a detection result from the second edge detection portion 36. In this case, more robust line drawing judgment is enabled by using image signals having different resolution characteristics.

Judgment is made in the character/line drawing judgment portion 38 by using a screen dot area judgment result from the screen dot area judgment portion 33 and a detection result from the second edge detection portion 36. Alternatively, judgment is made in the character/line drawing judgment portion 38 by using a screen dot area judgment result from the screen dot area judgment portion 33, a detection result from the first edge detection portion 34 and a detection result from the second edge detection portion 36. In this case, the screen dot area can be accurately judged by using the image signal having high resolution, and a character in the screen dot area can be accurately detected by using the image signal having low resolution (that is because the dot is smoothed in case of the image signal having low resolution).

Judgment is made in the character/line drawing judgment portion 38 by using a detection result from the first edge detection portion 34 and a judgment result from the line width judgment portion 35. Alternatively, judgment is made in the character/line drawing judgment portion 38 by using a detection result from the first edge detection portion 34, a detection result from the second edge detection portion 36 and a judgment result from the line width judgment portion 35. In this case, it is possible to put restraints on determining only a contour with a heavy line as a line drawing as a result of line width judgment with a small memory quantity by using the image signal having low resolution. The detection accuracy of the thin line is improved by using the image signal having high resolution, whereas the detection accuracy of the heavy line is improved by using the image signal having the resolution.

As described above, according to the embodiment of the present invention, color judgment which is rarely affected by lens aberration of the scanner is enabled by using a color image with low resolution.

Further, using images having different resolution characteristics enables the further robust line drawing judgment.

Furthermore, the screen dot area can be accurately judged by using an image having high resolution, and a character in a screen dot area can be accurately detected by using an image having low resolution (the dot is smoothed in the case of an image having low resolution).

Moreover, it is possible to put restraints on determining only a contour of a heavy line as a line drawing as a result of line width judgment with a small memory quantity by using an image having the low resolution.

In addition, the detection accuracy of a thin line can be improved by using an image having high resolution, whereas the detection accuracy of a heavy line can be improved by using an image having low resolution.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image processing apparatus which processes a plurality of image signals inputted from an image reading apparatus which has a first image reading section consisting of one or a plurality of line CCD sensors and a second image reading section consisting of a plurality of line CCD sensors having different color characteristics and reads an image of a document, said image processing apparatus comprising:
   a detection section which detects whether a remarked pixel in a first image signal read by said first image reading section is of an edge;
   a color judgment section which makes judges whether said remarked pixel in a second image signal read by said second image reading section has a chromatic color or an achromatic color; and
   a black line drawing judgment section which judges whether said remarked pixel is of a black line drawing based on a detection result from said detection section and a judgment result from said color judgment section.

2. An image processing apparatus according to claim 1, wherein said first image reading section is a brightness sensor having high resolution.

3. An image processing apparatus according to claim 1, wherein said second image signal read by said second image reading section is a red signal, a green signal and a blue signal.

4. An image processing apparatus according to claim 1, wherein said detection section analyzes a gradient quantity of pixel values around said remarked pixel in said first image signal and detects whether said remarked pixel is an edge.

5. An image processing apparatus which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing apparatus comprising:
- a first detection section which detects whether a remarked pixel in a first image signal read by said first image reading section is of an edge;
- a second detection section which detects whether said remarked pixel in a second image signal read by said second image reading section is of an edge; and
- a line drawing judgment section which judges whether said remarked pixel is of a line drawing by using one or both of a detection result from said first detection section and a detection result from said second detection section.

6. An image processing apparatus according to claim 5, wherein said second detection section analyzes a gradient quantity of pixel values around a remarked pixel in said second image signal and detects whether said remarked pixel is of an edge.

7. An image processing apparatus which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing apparatus comprising:
- an area judgment section which judges whether a remarked pixel in a first image signal read by said first image reading section belongs to a screen dot area;
- a detection section which detects whether said remarked pixel in a second image signal read by said second image reading section is of an edge; and
- a line drawing judgment section which judges whether said remarked pixel is of a line drawing by using a judgment result from said area judgment section and a detection result from said detection section.

8. An image processing apparatus which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing apparatus comprising:
- an area judgment section which judges whether a remarked pixel in a first image signal read by said first image reading section belongs to a screen dot area;
- a first detection section which detects whether said remarked pixel in said first image signal read by said first image reading section is of an edge;
- a second detection section which detects whether said remarked pixel in a second image signal read by said second image reading section is of an edge; and
- a line judgment section which judges whether said remarked pixel is of a line drawing by using a judgment result from said area judgment section, a detection result from said first detection section and a detection result from said second detection section.

9. An image processing apparatus which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing apparatus comprising:
- a detection section which detects whether a remarked pixel in a first image signal read by said first image reading section is of an edge;
- a line width judgment section which judges whether said remarked pixel in a second image signal read by said second image reading section exists in a predetermined line segment; and
- a line drawing judgment section which judges whether said remarked pixel is of a line drawing by using a detection result from said detection section and a judgment result from said line width judgment section.

10. An image processing apparatus which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing apparatus comprising:
- a first detection section which detects whether a remarked pixel in a first image signal read by said first image reading section is of an edge;
- a second detection section which detects whether said remarked pixel in a second image signal read by said second image reading section is of an edge;
- a line width judgment section which judges whether said remarked pixel in said second image signal read by said second image reading section exists in a predetermined line segment; and
- a line drawing judgment section which judges whether said remarked pixel is of a line drawing by using a detection result from said first detection section, a detection result from said second detection section and a judgment result from said line width judgment section.

11. An image processing apparatus which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing apparatus comprising:
- an area judgment section which judges whether a remarked pixel in said first image signal read by said first image reading section belongs to a screen dot area;
- a first detection section which detects whether said remarked pixel in said first image signal read by said first image reading section is of an edge;
- a line width judgment section which judges whether said remarked pixel in a second image signal read by said second image reading section exists in a predetermined line segment;
- a second detection section which detects whether said remarked pixel in said second image signal read by said second image reading section is of an edge;
- a color judgment section which judges whether said remarked pixel in said second image signal read by said second image reading section has a chromatic color or an achromatic color; and
- a character/line drawing judgment section which judges whether said remarked pixel is a pixel of a black character/line drawing, or a pixel of a character/line drawing having a color other than black, or not a pixel of a character/line drawing part by using a judgment result from said area judgment section, a judgment result from said line width judgment section and a judgment result from said color judgment section, and a detection result from said first detection section and a detection result from said second detection section.

12. An image processing method which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing method comprising:
  detecting whether a remarked pixel in a first image signal read by said first image reading section is of an edge;
  judging whether said remarked pixel in a second image signal read by said second image reading section has a chromatic color or an achromatic color; and
  judging whether said remarked pixel is of a black line drawing from the detection result in said first image signal and the judgment result in said second image signal.

13. An image processing method which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing method comprising:
  detecting whether a remarked pixel in a first image signal read by said first image reading section is of an edge;
  detecting whether said remarked pixel in a second image signal read by said second image reading section is of an edge; and
  judging whether said remarked pixel is of a line drawing by using one or both of the detection result in said first image signal and the detection result in said second image signal.

14. An image processing method which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing method comprising:
  judging whether a remarked pixel in a first image signal read by said first image reading section belongs to a screen dot area;
  detecting whether said remarked pixel in a second image signal read by said second image reading section is of an edge; and
  judging whether said remarked pixel is of a line drawing by using the judgment result in said first image signal and the detection result in said second image signal.

15. An image processing method which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing method comprising:
  judging whether a remarked pixel in a first image signal read by said first image reading section belongs to a screen dot area;
  detecting whether said remarked pixel in said first image signal read by said first image reading section is of an edge;
  detecting whether said remarked pixel in a second image signal read by said second image reading section is of an edge; and
  judging whether said remarked pixel is of a line drawing by using said area judgment result, the detection result in said first image signal and the detection result in said second image signal.

16. An image processing method which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing method comprising:
  detecting whether a remarked pixel in a first image signal read by said first image reading section is of an edge;
  judging whether said remarked pixel in a second image signal read by said second image reading section exists in a predetermined line segment; and
  judging whether said remarked pixel is of a line drawing by using the detection result in said first image signal and the judgment result in said second image signal.

17. An image processing method which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing method comprising:
  detecting whether a remarked pixel in a first image signal read by said first image reading section is of an edge;
  detecting whether said remarked pixel in a second image signal read by said second image reading section is of an edge;
  judging whether said remarked pixel in said second image signal read by said second image reading section exists in a predetermined line segment; and
  judging whether said remarked pixel is of a line drawing by using the detection result in said first image signal, the detection result and said judgment result in said second image signal.

18. An image processing method which processes a plurality of image signals input from an image reading apparatus which has a first image reading section consisting of one or a plurality of line CCD sensors and a second image reading section consisting of a plurality of line CCD sensors having different color characteristics and reads an image of a document, said image processing method comprising:
  judging whether a remarked pixel in a first image signal read by said first image reading section belongs to a screen dot area;
  detecting whether said remarked pixel in said first image signal read by said first image reading section is of an edge;
  judging whether said remarked pixel in a second image signal read by said second image reading section exists in a predetermined line segment;
  detecting whether said remarked pixel in said second image signal read by said second image reading section is of an edge;
  judging whether said remarked pixel in said second image signal read by said second image reading section has a chromatic color or an achromatic color; and
  judging whether said remarked pixel is a pixel of a black character/line drawing, or a pixel of a character/line drawing having any color other than black, or not a pixel of a character/line drawing part by using the judgment result on whether said remarked pixel belongs to said screen dot area, the judgment result on whether it exists in said predetermined line segment and the judgment result on whether it has said chromatic color or said achromatic color, and from the detection result in said first image signal and the detection result in said second image signal.

* * * * *